UNITED STATES PATENT OFFICE.

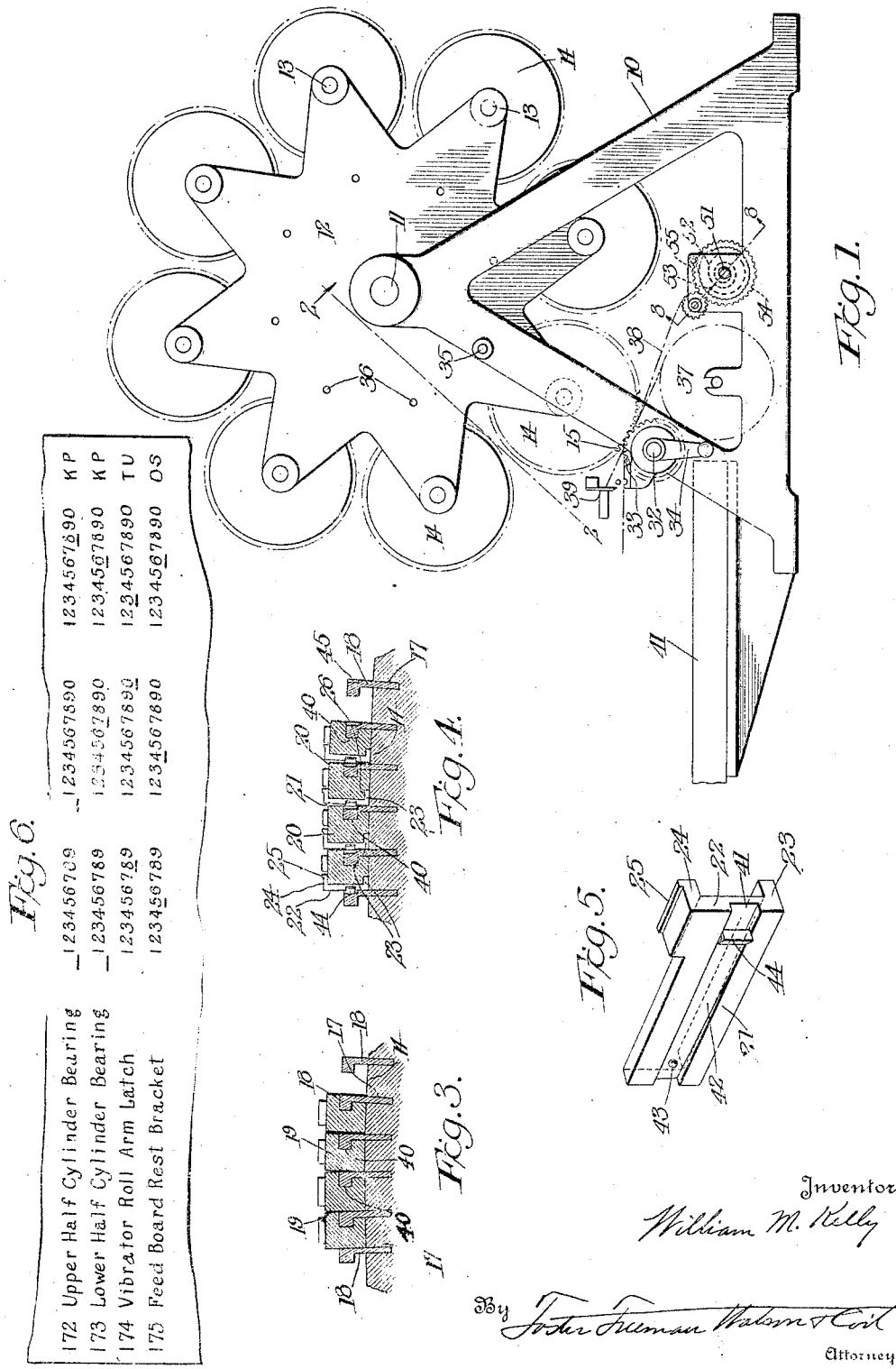

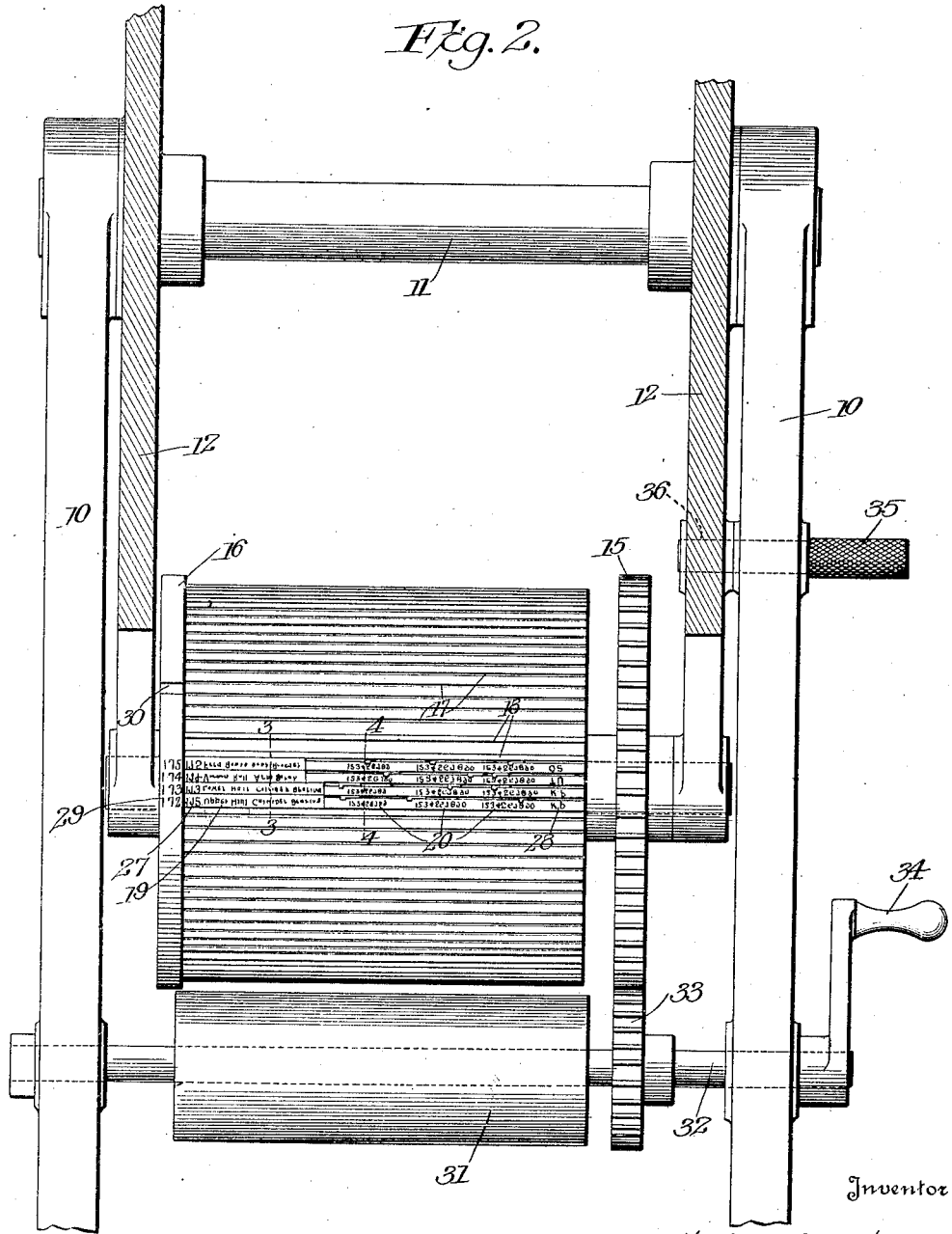

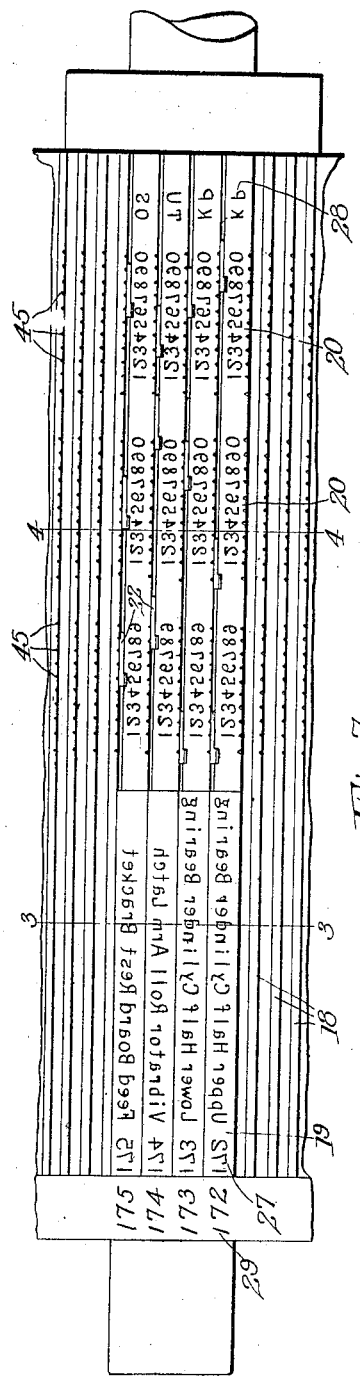
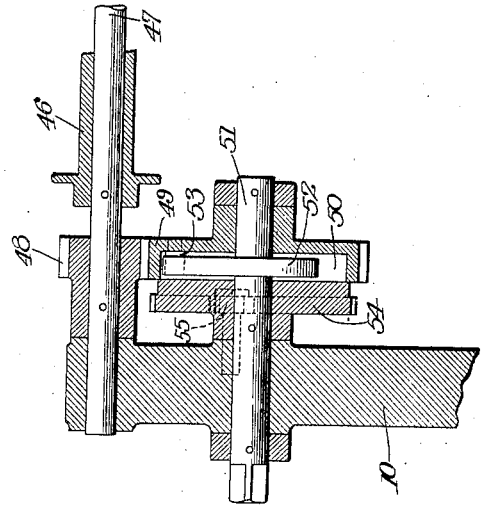

WILLIAM M. KELLY, OF JERSEY CITY, NEW JERSEY.

STOCK INDICATING AND RECORDING DEVICE.

1,343,511.        Specification of Letters Patent.    Patented June 15, 1920.

Application filed May 25, 1917. Serial No. 170,954.

*To all whom it may concern:*

Be it known that I, WILLIAM M. KELLY, a citizen of the United States, residing at Jersey City, Hudson county, State of New Jersey, have invented certain new and useful Improvements in Stock Indicating and Recording Devices, of which the following is a specification.

This invention relates to a stock indicating and recording device, and comprises means for representing a plurality of articles and means associated with the article representing means for indicating the balance on hand of each article. Means is also provided whereby a record may be made at any time, which record shows the quantity of each article in stock at the time it is taken. The invention also includes means for indicating when the quantity of any article in stock is below a certain amount, or above a certain amount, that is, a danger signal is provided to give warning when the stock is below or above a certain amount.

Other features of the invention will be apparent from the description taken in connection with the drawings, in which, Figure 1 is a side elevation of the stock indicating and recording device;

Fig. 2 is an enlarged sectional view taken substantially on the line 2—2 of Fig. 1;

Fig. 3 is a sectional detail view taken on the line 3—3 of Fig. 2;

Fig. 4 is a similar sectional detail view taken on the line 4—4 of Fig. 2;

Fig. 5 is a perspective view of the indicator which is associated with the groups of numeral characters;

Fig. 6 is a view of a part of a record taken from the device.

Fig. 7 is an enlarged plan view of a portion of a drum.

Fig. 8 is a sectional view taken substantially on the line 8—8 of Fig. 1.

It is well recognized today that all concerns should have some system for accurately and easily keeping account of stock and for indicating when the quantity of any article on hand has fallen below a predetermined minimum amount or exceeds a certain maximum amount. If the quantity of any article on hand is allowed to get too low, embarrassing and expensive delays may result. If the quantity on hand is allowed to become too great, then capital is tied up in unproductive stock, thereby increasing the overhead expenses. The principal objects of this invention are to provide a device which can be operated very easily and quickly to give a visible indication of the amount of stock on hand and whether the quantity on hand is below or above a certain figure, and to provide means for almost instantly making a record of the condition of the stock at any time. I will now describe the at present preferred embodiment of my invention.

As shown in the drawings the device comprises two spaced triangular side frames 10 which at their upper ends rotatively support the shaft 11, which has secured thereto inside the side frame, the two spiders or frames 12. Rotatively supported in these spiders is a circularly arranged series of shafts 13, each of which has secured thereto a drum 14 and a gear wheel 15 at one end of the drum. A disk 16 is rotatively mounted on the shaft at the other end of the drum; the disk, drum and gear wheel being interposed between the two spiders. As each of the shafts 13 carry like parts, a description of one set will suffice.

Referring to Figs. 2, 3 and 4, it will be noted that the drum is formed with a series of grooves 17, in its cylindrical surface, the grooves extending axially and being parallel. As clearly shown in Figs. 3 and 4 type retaining members 18 are secured in the grooves. These members are angular or L-shaped in cross-section, the stem being fastened in the groove in any desired manner so that the base of the L is spaced from the surface of the drum. The type 19, 20, are formed with a groove 40 in one side which is adapted to receive the projecting portion of the type retaining members 18, thus securing the type to the drum. In my device means are provided for representing a plurality of articles, which may be kept in stock and this means consists of the type 19. These type occupy only a portion of the length of the drum, the remaining portion being used for denominationally arranged groups of numeral characters. For this purpose I use the type 20. As shown in Fig. 2 and by the printed record illustrated in Fig. 6, I provide a plurality of these groups of numeral type. Each group consists of the numerals 1, 2, 3, 4, 5, 6, 7, 8, 9, 0, and may be on a single slug or individual type. The group which represents the highest denomination, however, does not have the character 0.

As viewed in Figs. 6 and 7 the right hand group of numerals is used for units, the next group for tens and the third group for hundreds. Other groups can be provided if desired. In order to show which numeral of each group is selected to thereby display the quantity of the article in stock an indicator 21 is associated with each group of numerals. As illustrated in Figs. 4 and 5, this indicator may be slidingly mounted, and for this purpose may be formed with a web portion 22 having a lateral flange 23 at the bottom thereof and a shorter flange 24 at the top, which may be formed with an impression surface 25. The type 20, at the side opposite the groove 40, may be formed with a groove 26 adapted to receive the flange 23 of the indicator. The flange 24 is arranged to slide on the top of the type 20 and the web 22 is interposed between the said type and a retaining member 18, the type 20, and indicator 21 being constructed and arranged to fit between two adjacent retaining members 18. The impression surface 25 is of a length substantially equal to the width of a numeral on the type 20, and thereby indicates one of the numerals of each group of numeral characters. It is desirable to provide means so that the indicator will always take a position opposite a numeral character. For this purpose the indicators and members 18 are formed with coöperating springs and notches. As clearly shown in Fig. 5, the indicator is formed with a groove 41, in which is arranged a spring 42, secured to the indicator as at 43 and having a V-shaped projection 44 at its free end. Referring to Figs. 4 and 7 it will be noted that the members 18 on one side thereof are formed with notches 45, which are arranged so that when the projection of the spring of an indicator is in a notch the impression surface or underscore of the indicator will be directly under a numeral character, with the single exception that a notch is provided to properly hold the indicator in the space at the left of the groups of numeral characters.

As shown in Figs. 2, 6 and 7 each article may also be designated by a numeral 27 or other identification symbol, which may be arranged at the beginning of the line of type, and at the opposite end, other symbols or characters 28, may be arranged to show, for example, where the article comes from. For instance the characters O S might be used to indicate that the article was purchased outside. Thus each row of type may include an identifying symbol, a representation of the article, denominationally arranged groups of numeral characters and if desired, characters to give other information in regard to the article. Although I have described and illustrated a specific structure for each line of type, it is obvious that the desired result might be accomplished in other ways. For instance, the balance of any article on hand might be indicated by other means than the type 20 and indicators 21, the only requirement being that a means be provided which can be easily manipulated by a clerk to show the correct balance of the article on hand after each transaction.

The disk 16 has on its peripheral surface, characters or symbols which are the same as the characters 27, except that characters 27 are upside-down as viewed by the operator so that they will print a proper record whereas the characters 29 are upright being provided so that the operator will not be obliged to read the characters 27, which as stated are upside-down. The diameter of the periphery of the disk 16, is greater than that of the drum, but less than the outside diameter with the type thereon, so that the characters 29 will not print on the record sheet. The outer surface of said disk may be formed with a groove 30, through which the type may be passed to insert them on the drum, the disk being rotatable so that the groove on the disk will aline with any groove on the drum.

In order to make a record of the indications on the drum, at any time, the device is provided with a platen roll 31, mounted on a shaft 32, carried by the side frames 10. The shaft 32 is so located and the diameter of the platen roll is such, that the drums 14 may be brought to a position so that any one of them will have the type thereon in proper relation to print on a sheet carried through between the drum and platen roll. In order to rotate the drum and roll in rolling contact, a shaft 32 carries a gear 33, with which the gears 15 on the drum shafts may mesh, and said shaft 32 may be turned by a hand crank 34. Any of the drums may be held in proper position to coöperate with the roll by means of the pin 35 which extends through the frame 10 and is adapted to engage in any one of the holes 36 in one of the spiders 12.

The frames 10 also carry a roll 37 of paper, on which the record is printed, and a roll 46, of transfer material 38. The paper and transfer material are threaded up between the drum and platen roll as shown in Fig. 1, and when crank 34 is turned, a record of the indications on the drum will be made on the paper, which may be cut off by any means, such as knife 39, and allowed to drop into a tray 41. After the drum has made a complete revolution the transferred material is released and is automatically rewound on the roll 46. This printing operation may be repeated with each of the drums 14. As shown in Figs. 1 and 8 the roll 46 is secured to a shaft 47 carried by the side frames 10. A pinion 48 is fast with the shaft 47 and meshes with a gear 49, which is formed with circular chamber 50 in one side. This gear which is loosely mounted on a stub shaft or pin 51 has a coil spring 52 in the chamber 50, one end of the spring being secured to the shaft 51 and the other to the gear as by a pin 53. A ratchet wheel 54 is secured to shaft 51 and is held against rotation in one direction by a pawl 55 carried by the frame 10. When the transfer material is unwound from roll 46 the gear 49 is rotated to thereby place spring 52 under tension, the rotation of shaft 51 being prevented by the ratchet and pawl. Thus when the printing operation for a drum is completed the transfer material being released, is automatically rewound on its roller 46 by the spring 52.

A portion of a record as printed by my device is illustrated in Fig. 6. In the first line the only numeral underscored is the 8 of the units group. There are therefore eight of these parts 172, in stock. The second line indicates that there are seventy-six of the article 173 in stock. The third line shows 803 and the fourth line 546 of the respective articles in stock. Of course these same indications are visible on the drum, and the condition of stock may be determined by a glance at a drum. It will be apparent that the position of the indicators 21 or the underscore made thereby on the printed record constitutes a means for showing whether the stock is above or below certain amounts. Thus the presence of the indicator at the left of the first or hundred group of numerals, as illustrated in lines 1 and 2 of Fig. 6 shows that the stock of these parts is below one hundred, whereas the absence of the indicator tells that the stock is above 99. Likewise if an indicator is between the tens and hundreds groups, as illustrated in line 1 of Fig. 6, the stock of parts is immediately shown to be less than ten. In checking over stock therefore, the stock keeper would first glance at the space between the units and tens groups of numerals. If there is an indicator present in this space, he knows immediately that there is no stock of the particular article on hand. Thus the presence of an indicator in this space is a warning or danger signal, indicating that the stock of some article is exhausted. The stock keeper would next glance down the space between the tens and hundreds groups. The presence of an indicator in this space shows that the stock of the corresponding article is below ten, and thus is a danger signal indicating that the stock of some article is below ten. Likewise the presence of an indicator in the space at the left of the hundreds groups tells that the stock of the associated article is below one hundred. Thus, means is provided to indicate when the stock of any article is below a given quantity. The positions of the indicators also constitute means to tell when the stock of an article is above a certain amount. Thus, the absence of indicators from the space between the units and tens groups shows the stock to be at least one. The absence of indicators from the space between the tens and hundreds shows that the stock is greater than nine, while the absence of an indicator from the space at the left of the hundreds group shows the stock to be greater than ninety-nine.

In the operation of my device, the type having been set up on the drum or support, the indicators 21 are moved to show the balance of each article on hand after any transaction. Whenever it is desired to make a record of the balances, the spiders are turned to bring the drum to printing position, where it is held by pin 35.

The paper and transfer material having been threaded between the drum and platen roller, the crank 34 is turned to cause the drum to make one revolution, and the paper record is then cut off by the knife 39, the transfer material being automatically rewound on roller 38.

Although I have shown and described a specific embodiment of my invention, it is apparent that many of the details thereof may be varied without departing from the spirit of my invention.

Having thus described the invention what is claimed and desired to be secured by Letters Patent is:

1. A stock indicating and recording device including, in combination, a support, means carried by said support representing a plurality of articles, and quantity indicating means also carried by the support associated with the first means operable at each addition to or withdrawal from stock to show the balance of each article on hand.

2. A stock indicating and recording device, including, in combination, a rotatably mounted drum, and a plurality of rows of visible impression means carried on the periphery of said drum: each row including article representing characters, denominationally arranged groups of numeral characters and an indicator associated with each of said groups.

3. A stock indicating and recording device including, in combination, a support, means carried by said support representing a plurality of articles, quantity indicating means also carried by the support associated with the first means operable at each addition to or withdrawal from stock to show the balance of each article on hand, and means for making a printed record of the articles and balances at any time.

4. A stock indicating and recording device including, in combination, a rotatably mounted drum, and a plurality of rows of visible impression means carried on the periphery of said drum; each row including article representing characters, denominationally arranged spaced groups of numeral characters and an indicator associated with each of said groups.

5. A stock indicating and recording device including, in combination, a rotatably mounted drum, and a plurality of rows of visible impression means carried on the periphery of said drum; each row including article representing characters, denominationally arranged spaced groups of numeral characters and an indicator associated with each of said groups, and movable into the space at one side of its associated group.

6. A stock indicating and recording device including, in combination, a rotatably mounted drum, and a plurality of rows of visible impression means carried on the periphery of said drum; each row including article representing characters, denominationally arranged groups of numeral characters and an indicator associated with each of said groups and means for making a printed record from said impression means.

7. A stock indicating and recording device including, in combination, a support, and a plurality of rows of visible impression means carried by said support; each row including article representing characters, denominationally arranged groups of numeral characters and an indicator associated with each of said groups.

8. A stock indicating and recording device including, in combination, a support, and a plurality of rows of visible characters carried by said support; each row including article representing characters, denominationally arranged groups of numeral characters and an indicator associated with each of said groups.

9. A stock indicating and recording device including, in combination, a support, and a plurality of rows of visible characters carried by said support; each row including article representing characters, denominationally arranged spaced groups of numeral characters and an indicator associated with each of said groups movable into the space at one side of its associated group.

10. A stock indicating and recording device including, in combination, a support and a plurality of rows of visible impression means carried by said support; each row including article representing characters, denominationally arranged groups of numeral characters and an indicator associated with each of said groups and means for making a printed record from said impression means.

11. A machine of the class described including a support carrying rows of type, means for securing the type to the support comprising L shaped members fastened to the support, and a movable underscore carried by some of the type interposed between one side of the type and the adjacent L shaped member.

12. A machine of the class described including a support carrying rows of type, means for securing the type to the support and a movable underscore for some of the type having a top flange engaging the face of the type body and coacting spring and notches on the underscore and type securing means to hold the underscore in register with a selected character of the type.

13. A machine of the class described including a support carrying rows of type, means for securing the type to the support comprising spaced parallel type retaining members projecting from the surface of the support, an underscore for the type arranged between the side of the type and the adjacent retaining member and having a projecting flange engaging in a groove in the type.

14. A machine of the class described including a support carrying rows of type, means for securing the type to the support comprising spaced parallel type retaining members projecting from the surface of the support, an underscore for the type arranged between the side of the type and the adjacent retaining member and having a projecting flange engaging in a groove in the type and yieldable means to hold the underscore in register with a selected character of the type.

15. As an article of manufacture, an underscore or indicator for type comprising a web portion having a spring catch on one side thereof, a flange at the bottom of the other side and a flange at the top thereof having the underscore character.

16. As an article of manufacture, an underscore or indicator for type comprising a web portion having a flange at the top and bottom of one side thereof and a spring catch carried by the web.

17. A stock indicating and recording device including a drum provided with means to hold rows of type on its surface, each row of type consisting of a portion representing an article and denominationally arranged groups of numeral characters, and a movable indicator slidingly carried by each group of numeral characters.

18. A stock indicating and recording device including a support, means on said support representing a plurality of articles, denominationally arranged groups of numeral characters associated with each representation of an article, and an indicator for each group, each indicator and its associated group of numeral characters being relatively movable.

In testimony whereof I affix my signature.

WILLIAM M. KELLY.